(12) United States Patent
Fernando

(10) Patent No.: US 9,178,669 B2
(45) Date of Patent: Nov. 3, 2015

(54) NON-ADJACENT CARRIER AGGREGATION ARCHITECTURE

(75) Inventor: Udara C. Fernando, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/411,463

(22) Filed: Mar. 2, 2012

(65) Prior Publication Data

US 2012/0294299 A1 Nov. 22, 2012

Related U.S. Application Data

(60) Provisional application No. 61/487,172, filed on May 17, 2011.

(51) Int. Cl.
*H04H 20/67* (2008.01)
*H04L 5/00* (2006.01)
*H04B 7/08* (2006.01)

(52) U.S. Cl.
CPC ... *H04L 5/00* (2013.01); *H04B 7/08* (2013.01)

(58) Field of Classification Search
CPC ............ H04L 5/00; H04B 7/08; H04W 28/26
USPC ......................................................... 370/339
See application file for complete search history.

(56) References Cited

U.S. PATENT DOCUMENTS

| 3,911,364 A | 10/1975 | Langseth et al. |
| 4,035,728 A | 7/1977 | Ishikawa et al. |
| 4,035,729 A | 7/1977 | Perry |
| 4,246,655 A | 1/1981 | Parker |
| 4,326,294 A | 4/1982 | Okamoto et al. |
| 4,715,048 A | 12/1987 | Masamura |

(Continued)

FOREIGN PATENT DOCUMENTS

| CN | 1523912 A | 8/2004 |
| CN | 1922795 A | 2/2007 |

(Continued)

OTHER PUBLICATIONS

Aparin et al., "A Highly-integrated tri-band/quad-mode SiGe BiCMOS RF-to-baseband and receiver for wireless CDMA/WCDMA/AMPS applications with GPS capability", Solid-State Circuits Conference, 2002. Digest of Technical Papers. 2002 IEEE International Feb. 3-7, 2002, Piscataway, NJ, USA, IEEE, vol. 1, 2002, pp. 234-235, XP010585547, ISBN: 0-7803-7335-9.

(Continued)

*Primary Examiner* — Faruk Hamza
*Assistant Examiner* — Shah R Zaman

(57) ABSTRACT

A wireless communication device configured for providing carrier aggregation is described. The wireless communication device includes at least one antenna configured to receive a plurality of wireless signals. The wireless communication device also includes a first transceiver. The first transceiver includes a first downconverting circuitry. The wireless communication device further includes a second transceiver. The second transceiver includes a second downconverting circuitry. The wireless communication device also includes an inter-transceiver connection that routes a first signal from a low noise amplifier on the first transceiver to the second downconverting circuitry of the second transceiver.

15 Claims, 9 Drawing Sheets

(56) References Cited

U.S. PATENT DOCUMENTS

| | | |
|---|---|---|
| 4,742,563 A | 5/1988 | Fukumura |
| 4,756,023 A | 7/1988 | Kojima |
| 4,969,207 A | 11/1990 | Sakamoto et al. |
| 5,056,411 A | 10/1991 | Baker |
| 5,128,630 A | 7/1992 | Mijuskovic |
| 5,291,519 A | 3/1994 | Tsurumaru |
| 5,321,850 A | 6/1994 | Backstrom et al. |
| 5,345,601 A | 9/1994 | Takagi et al. |
| 5,390,342 A | 2/1995 | Takayama et al. |
| 5,559,838 A | 9/1996 | Nakagoshi |
| 5,566,364 A | 10/1996 | Mizoguchi et al. |
| 5,694,396 A | 12/1997 | Firouzbakht et al. |
| 5,697,083 A | 12/1997 | Sano |
| 5,761,613 A | 6/1998 | Saunders et al. |
| 5,794,159 A | 8/1998 | Portin |
| 5,805,643 A | 9/1998 | Seki et al. |
| 5,805,989 A | 9/1998 | Ushida |
| 5,835,853 A | 11/1998 | Enoki et al. |
| 5,940,452 A | 8/1999 | Rich |
| 5,999,815 A | 12/1999 | TenBrook et al. |
| 5,999,990 A | 12/1999 | Sharrit et al. |
| 6,026,288 A | 2/2000 | Bronner |
| 6,040,732 A | 3/2000 | Brokaw |
| 6,044,254 A | 3/2000 | Ohta et al. |
| 6,063,961 A | 5/2000 | Kroner |
| 6,069,923 A | 5/2000 | Ostman et al. |
| 6,088,348 A | 7/2000 | Bell, III et al. |
| 6,175,279 B1 * | 1/2001 | Ciccarelli ............. H03F 1/0261 330/285 |
| 6,208,844 B1 | 3/2001 | Abdelgany |
| 6,249,687 B1 | 6/2001 | Thomsen et al. |
| 6,407,689 B1 | 6/2002 | Bazarjani et al. |
| 6,424,683 B1 | 7/2002 | Schoellhorn |
| 6,430,237 B1 | 8/2002 | Anvari |
| 6,472,947 B1 | 10/2002 | Zeitz |
| 6,473,601 B1 | 10/2002 | Oda |
| 6,522,895 B1 * | 2/2003 | Montalvo ............... H04B 1/005 455/188.1 |
| 6,535,725 B2 | 3/2003 | Hatcher et al. |
| 6,600,759 B1 | 7/2003 | Wood |
| 6,600,907 B1 | 7/2003 | Taguchi |
| 6,600,931 B2 | 7/2003 | Sutton et al. |
| 6,657,498 B2 | 12/2003 | Park et al. |
| 6,806,777 B2 | 10/2004 | Franca-Neto |
| 6,819,941 B2 | 11/2004 | Dening et al. |
| 6,888,888 B1 | 5/2005 | Tu et al. |
| 6,952,594 B2 | 10/2005 | Hendin |
| 6,954,446 B2 | 10/2005 | Kuffner |
| 6,983,132 B2 | 1/2006 | Woo et al. |
| 6,985,712 B2 | 1/2006 | Yamakawa et al. |
| 6,987,950 B2 | 1/2006 | Coan |
| 7,013,166 B2 | 3/2006 | Clifford |
| 7,023,272 B2 | 4/2006 | Hung et al. |
| 7,024,172 B1 | 4/2006 | Murphy et al. |
| 7,039,377 B2 | 5/2006 | Yates |
| 7,123,891 B2 | 10/2006 | Loke |
| 7,142,042 B1 | 11/2006 | Henry |
| 7,161,423 B2 | 1/2007 | Paul et al. |
| 7,167,044 B2 | 1/2007 | Li et al. |
| 7,187,239 B2 | 3/2007 | Yeh |
| 7,187,735 B2 | 3/2007 | Kent, III et al. |
| 7,187,904 B2 | 3/2007 | Gainey et al. |
| 7,212,788 B2 | 5/2007 | Weber et al. |
| 7,224,231 B2 | 5/2007 | Wu |
| 7,260,377 B2 | 8/2007 | Burns et al. |
| 7,283,851 B2 | 10/2007 | Persico et al. |
| 7,299,021 B2 | 11/2007 | Pärssinen et al. |
| 7,313,368 B2 | 12/2007 | Wu et al. |
| 7,317,894 B2 | 1/2008 | Hirose |
| 7,333,831 B2 | 2/2008 | Srinivasan et al. |
| 7,356,325 B2 | 4/2008 | Behzad et al. |
| 7,372,336 B2 | 5/2008 | Lee et al. |
| 7,403,508 B1 | 7/2008 | Miao |
| 7,444,166 B2 | 10/2008 | Sahota |
| 7,454,181 B2 | 11/2008 | Banister et al. |
| 7,477,106 B2 | 1/2009 | Van Bezooijen et al. |
| 7,486,135 B2 | 2/2009 | Mu |
| 7,570,111 B1 * | 8/2009 | Vagher ................... H03F 3/211 330/126 |
| 7,599,675 B2 | 10/2009 | Mu et al. |
| 7,643,847 B2 | 1/2010 | Daanen et al. |
| 7,643,848 B2 | 1/2010 | Robinett |
| 7,697,905 B2 | 4/2010 | Lee et al. |
| 7,728,664 B2 | 6/2010 | Chang et al. |
| 7,751,513 B2 | 7/2010 | Eisenhut et al. |
| 7,764,726 B2 | 7/2010 | Simic et al. |
| 7,848,724 B2 | 12/2010 | Bult et al. |
| 7,869,528 B2 | 1/2011 | Robinson |
| 7,877,075 B1 | 1/2011 | Jin et al. |
| 7,911,269 B2 | 3/2011 | Yang et al. |
| 7,944,298 B2 | 5/2011 | Cabanillas et al. |
| 7,949,309 B2 | 5/2011 | Rofougaran et al. |
| 7,952,398 B2 | 5/2011 | Salcido et al. |
| 8,022,772 B2 | 9/2011 | Cassia et al. |
| 8,055,229 B2 | 11/2011 | Huang |
| 8,063,706 B2 | 11/2011 | Li et al. |
| 8,081,672 B2 | 12/2011 | Kent et al. |
| 8,090,332 B2 | 1/2012 | Sahota et al. |
| 8,090,369 B2 | 1/2012 | Kitazoe |
| 8,139,670 B1 | 3/2012 | Son et al. |
| 8,149,955 B2 | 4/2012 | Tired |
| 8,195,117 B2 | 6/2012 | Bult et al. |
| 8,208,887 B2 | 6/2012 | Lee et al. |
| 8,217,723 B2 | 7/2012 | Rajendran et al. |
| 8,242,841 B2 | 8/2012 | Zhang |
| 8,270,927 B2 | 9/2012 | Wallace et al. |
| 8,290,449 B2 | 10/2012 | Keehr et al. |
| 8,295,778 B2 | 10/2012 | Kotecha et al. |
| 8,306,494 B2 | 11/2012 | Ojo |
| 8,442,473 B1 | 5/2013 | Kaukovuori et al. |
| 8,514,015 B2 | 8/2013 | Chen |
| 8,571,510 B2 | 10/2013 | Liu et al. |
| 8,600,315 B2 | 12/2013 | Roufoogaran et al. |
| 8,626,084 B2 | 1/2014 | Chan et al. |
| 8,676,148 B2 | 3/2014 | Ogasawara |
| 8,706,069 B2 | 4/2014 | Khoini-Poorfard et al. |
| 2002/0008575 A1 | 1/2002 | Oskowsky et al. |
| 2002/0061773 A1 | 5/2002 | Adachi et al. |
| 2002/0111163 A1 * | 8/2002 | Hamabe ............. H04W 72/082 455/425 |
| 2002/0132597 A1 | 9/2002 | Peterzell et al. |
| 2002/0173337 A1 | 11/2002 | Hajimiri et al. |
| 2002/0193108 A1 | 12/2002 | Robinett |
| 2003/0076797 A1 | 4/2003 | Lozano |
| 2003/0081694 A1 | 5/2003 | Wieck |
| 2003/0125040 A1 | 7/2003 | Walton et al. |
| 2003/0148750 A1 | 8/2003 | Yan et al. |
| 2003/0157915 A1 | 8/2003 | Atkinson et al. |
| 2003/0176176 A1 | 9/2003 | Leinonen et al. |
| 2003/0203743 A1 | 10/2003 | Sugar et al. |
| 2003/0206076 A1 | 11/2003 | Hashemi et al. |
| 2003/0228851 A1 | 12/2003 | Taniguchi |
| 2004/0087290 A1 | 5/2004 | Schmidt et al. |
| 2004/0092243 A1 | 5/2004 | Hey-Shipton |
| 2004/0113746 A1 | 6/2004 | Brindle |
| 2004/0116086 A1 | 6/2004 | Huttunen |
| 2004/0121753 A1 | 6/2004 | Sugar et al. |
| 2004/0204104 A1 | 10/2004 | Horng et al. |
| 2004/0219959 A1 | 11/2004 | Khayrallah et al. |
| 2004/0224643 A1 | 11/2004 | Nakai |
| 2004/0253955 A1 | 12/2004 | Love et al. |
| 2004/0266356 A1 | 12/2004 | Javor et al. |
| 2005/0039060 A1 | 2/2005 | Okayasu |
| 2005/0075077 A1 | 4/2005 | Mach et al. |
| 2005/0079847 A1 | 4/2005 | Arafa |
| 2005/0118977 A1 | 6/2005 | Drogi et al. |
| 2005/0197090 A1 | 9/2005 | Stockstad et al. |
| 2005/0215264 A1 | 9/2005 | Subramaniam et al. |
| 2005/0265084 A1 | 12/2005 | Choi |
| 2005/0277387 A1 | 12/2005 | Kojima et al. |
| 2006/0009177 A1 | 1/2006 | Persico et al. |
| 2006/0023745 A1 | 2/2006 | Koo et al. |
| 2006/0061773 A1 | 3/2006 | Lee et al. |
| 2006/0121937 A1 | 6/2006 | Son |

(56) References Cited

U.S. PATENT DOCUMENTS

| | | |
|---|---|---|
| 2006/0128322 A1 | 6/2006 | Igarashi et al. |
| 2006/0146693 A1 | 7/2006 | Mori et al. |
| 2006/0189286 A1 | 8/2006 | Kyu et al. |
| 2006/0222100 A1 | 10/2006 | Behzad |
| 2006/0234662 A1 | 10/2006 | Diloisy |
| 2006/0291428 A1 | 12/2006 | Filipovic |
| 2007/0049332 A1 | 3/2007 | Higuchi |
| 2007/0060080 A1* | 3/2007 | Nishimura ........... H04B 1/0053 455/133 |
| 2007/0072577 A1 | 3/2007 | Rozenblit et al. |
| 2007/0105517 A1 | 5/2007 | Chang et al. |
| 2007/0142013 A1 | 6/2007 | Bucknor et al. |
| 2007/0177656 A1 | 8/2007 | Maruta et al. |
| 2007/0177693 A1 | 8/2007 | Kluge |
| 2007/0184801 A1 | 8/2007 | Kogawa et al. |
| 2007/0197170 A1* | 8/2007 | Boos ...................... H04B 1/406 455/78 |
| 2007/0197178 A1 | 8/2007 | Gu |
| 2007/0197204 A1 | 8/2007 | Herczog et al. |
| 2007/0202890 A1 | 8/2007 | Feher |
| 2007/0242784 A1 | 10/2007 | Sampson et al. |
| 2007/0243832 A1 | 10/2007 | Park et al. |
| 2007/0262817 A1 | 11/2007 | Ciccarelli et al. |
| 2007/0262871 A1 | 11/2007 | Yamagajo et al. |
| 2008/0004078 A1 | 1/2008 | Barratt et al. |
| 2008/0013654 A1 | 1/2008 | Rick et al. |
| 2008/0117999 A1 | 5/2008 | Kadous et al. |
| 2008/0139151 A1 | 6/2008 | Ojo et al. |
| 2008/0204148 A1 | 8/2008 | Kim et al. |
| 2008/0224770 A1 | 9/2008 | Kim et al. |
| 2008/0224791 A1 | 9/2008 | Cheng |
| 2008/0225971 A1 | 9/2008 | Behzad |
| 2008/0261650 A1 | 10/2008 | Piriyapoksombut et al. |
| 2009/0069020 A1* | 3/2009 | Wang .................... H04W 16/06 455/446 |
| 2009/0124227 A1 | 5/2009 | Ishiguro |
| 2009/0227214 A1 | 9/2009 | Georgantas et al. |
| 2009/0237161 A1 | 9/2009 | Fagg |
| 2009/0243869 A1 | 10/2009 | Sanderford, Jr. |
| 2009/0253456 A1 | 10/2009 | Toh et al. |
| 2009/0290659 A1 | 11/2009 | Petrovic et al. |
| 2009/0323779 A1 | 12/2009 | Lennen |
| 2010/0019970 A1 | 1/2010 | Farrokhi et al. |
| 2010/0034094 A1 | 2/2010 | Tenny |
| 2010/0040178 A1 | 2/2010 | Sutton et al. |
| 2010/0142416 A1* | 6/2010 | Kim ..................... H04B 7/15557 370/281 |
| 2010/0142440 A1 | 6/2010 | Inoue |
| 2010/0195754 A1 | 8/2010 | Li et al. |
| 2010/0197263 A1 | 8/2010 | Dwyer et al. |
| 2010/0210226 A1 | 8/2010 | Matsuyama |
| 2010/0210272 A1 | 8/2010 | Sundstrom et al. |
| 2010/0210299 A1 | 8/2010 | Gorbachov |
| 2010/0214184 A1 | 8/2010 | Tran et al. |
| 2010/0225414 A1* | 9/2010 | Gorbachov ............... H04B 1/48 333/101 |
| 2010/0226327 A1 | 9/2010 | Zhang et al. |
| 2010/0232493 A1 | 9/2010 | Thirumoorthy |
| 2010/0237947 A1 | 9/2010 | Xiong et al. |
| 2010/0253435 A1 | 10/2010 | Ichitsubo et al. |
| 2010/0265875 A1 | 10/2010 | Zhao et al. |
| 2010/0271986 A1 | 10/2010 | Chen |
| 2010/0272051 A1 | 10/2010 | Fu et al. |
| 2010/0301946 A1 | 12/2010 | Borremans |
| 2010/0311378 A1 | 12/2010 | Tasic et al. |
| 2010/0328155 A1 | 12/2010 | Simic et al. |
| 2010/0330977 A1 | 12/2010 | Kadous et al. |
| 2011/0018635 A1 | 1/2011 | Tasic et al. |
| 2011/0044380 A1 | 2/2011 | Marra et al. |
| 2011/0050319 A1 | 3/2011 | Wong |
| 2011/0084791 A1 | 4/2011 | Mun et al. |
| 2011/0086603 A1 | 4/2011 | Toosi et al. |
| 2011/0110463 A1 | 5/2011 | Chang et al. |
| 2011/0122972 A1 | 5/2011 | Lie et al. |
| 2011/0165848 A1 | 7/2011 | Gorbachov et al. |
| 2011/0193625 A1 | 8/2011 | Gatta et al. |
| 2011/0194504 A1 | 8/2011 | Gorokhov et al. |
| 2011/0204973 A1 | 8/2011 | Hu et al. |
| 2011/0211533 A1 | 9/2011 | Casaccia et al. |
| 2011/0217945 A1 | 9/2011 | Uehara et al. |
| 2011/0222443 A1 | 9/2011 | Khlat |
| 2011/0222444 A1 | 9/2011 | Khlat et al. |
| 2011/0242999 A1* | 10/2011 | Palanki .................. H04L 1/1887 370/252 |
| 2011/0250926 A1 | 10/2011 | Wietfeldt et al. |
| 2011/0268048 A1 | 11/2011 | Toskala et al. |
| 2011/0268232 A1 | 11/2011 | Park et al. |
| 2011/0292844 A1* | 12/2011 | Kwun .................. H04B 1/0057 370/278 |
| 2011/0299434 A1* | 12/2011 | Gudem .................. H04B 1/109 370/278 |
| 2011/0300810 A1 | 12/2011 | Mikhemar et al. |
| 2012/0009886 A1 | 1/2012 | Poulin |
| 2012/0013387 A1 | 1/2012 | Sankaranarayanan et al. |
| 2012/0026862 A1 | 2/2012 | Sadri et al. |
| 2012/0044927 A1 | 2/2012 | Pan et al. |
| 2012/0056681 A1 | 3/2012 | Lee |
| 2012/0057621 A1 | 3/2012 | Hong et al. |
| 2012/0195237 A1 | 8/2012 | Chan et al. |
| 2012/0236829 A1 | 9/2012 | Takano et al. |
| 2012/0293265 A1 | 11/2012 | Heikkinen et al. |
| 2012/0294299 A1 | 11/2012 | Fernando |
| 2012/0327825 A1 | 12/2012 | Gudem et al. |
| 2012/0329395 A1 | 12/2012 | Husted et al. |
| 2013/0003617 A1 | 1/2013 | Gudem et al. |
| 2013/0003783 A1 | 1/2013 | Gudem et al. |
| 2013/0043946 A1 | 2/2013 | Hadjichristos et al. |
| 2013/0051284 A1 | 2/2013 | Khlat |
| 2013/0114769 A1 | 5/2013 | Fernando |
| 2013/0163492 A1 | 6/2013 | Wong |
| 2013/0217398 A1 | 8/2013 | Winiecki et al. |
| 2013/0230080 A1 | 9/2013 | Gudem et al. |
| 2013/0231064 A1 | 9/2013 | Gudem et al. |
| 2013/0265892 A1 | 10/2013 | Fernando |
| 2013/0315348 A1 | 11/2013 | Tasic et al. |
| 2013/0316668 A1 | 11/2013 | Davierwalla et al. |
| 2013/0316669 A1 | 11/2013 | Davierwalla et al. |
| 2013/0316670 A1 | 11/2013 | Tasic et al. |
| 2013/0329665 A1 | 12/2013 | Kadous et al. |
| 2014/0072001 A1 | 3/2014 | Chang et al. |
| 2014/0113578 A1 | 4/2014 | Xu |
| 2014/0269853 A1 | 9/2014 | Gudem et al. |

FOREIGN PATENT DOCUMENTS

| | | |
|---|---|---|
| CN | 101018376 A | 8/2007 |
| CN | 101228702 A | 7/2008 |
| CN | 101242158 A | 8/2008 |
| CN | 101523967 A | 9/2009 |
| CN | 101789805 A | 7/2010 |
| EP | 1164719 A1 | 12/2001 |
| EP | 1370012 | 12/2003 |
| EP | 1398887 A1 | 3/2004 |
| EP | 1708372 A2 | 10/2006 |
| EP | 1726098 A1 | 11/2006 |
| EP | 1748567 A2 | 1/2007 |
| EP | 1761076 A2 | 3/2007 |
| EP | 2068583 A1 | 6/2009 |
| EP | 2141818 A1 | 1/2010 |
| EP | 1916767 B1 | 12/2010 |
| EP | 2393205 A2 | 12/2011 |
| EP | 2398285 A1 | 12/2011 |
| GB | 2472978 A | 3/2011 |
| JP | 05227234 | 9/1993 |
| JP | H0730452 A | 1/1995 |
| JP | 07221684 | 8/1995 |
| JP | 9027778 A | 1/1997 |
| JP | 09116458 | 5/1997 |
| JP | H11127300 A | 5/1999 |
| JP | 2000013278 A | 1/2000 |
| JP | 2001285114 | 10/2001 |
| JP | 2002261880 A | 9/2002 |
| JP | 2004015162 A | 1/2004 |
| JP | 2006520143 A | 8/2006 |

(56) References Cited

FOREIGN PATENT DOCUMENTS

| | | | |
|---|---|---|---|
| JP | 2007324711 A | 12/2007 | |
| JP | 2008085793 A | 4/2008 | |
| JP | 2008519535 A | 6/2008 | |
| JP | 2009027778 | 2/2009 | |
| JP | 2009130867 A | 6/2009 | |
| JP | 2011015112 A | 1/2011 | |
| JP | 2011082669 A | 4/2011 | |
| JP | 2011091747 A | 5/2011 | |
| JP | 2011119807 A | 6/2011 | |
| WO | WO0150636 | 7/2001 | |
| WO | 0237686 | 5/2002 | |
| WO | WO2005039060 | 4/2005 | |
| WO | 2005062477 A2 | 7/2005 | |
| WO | WO2005064816 A1 | 7/2005 | |
| WO | WO-2005088847 A1 | 9/2005 | |
| WO | 2006050515 A2 | 5/2006 | |
| WO | WO-2006118538 A2 | 11/2006 | |
| WO | 2008059257 A1 | 5/2008 | |
| WO | 2008084539 A1 | 7/2008 | |
| WO | WO-2008092745 A1 | 8/2008 | |
| WO | WO-2008103757 | 8/2008 | |
| WO | WO-2008145604 A1 | 12/2008 | |
| WO | WO-2010059257 A1 | 5/2010 | |
| WO | WO-2011019850 A1 | 2/2011 | |
| WO | WO-2011050729 A1 | 5/2011 | |
| WO | WO-2011092005 A1 | 8/2011 | |
| WO | WO-2011138697 A1 | 11/2011 | |
| WO | WO-2012008705 A2 | 1/2012 | |
| WO | 2012049529 A1 | 4/2012 | |
| WO | WO-2013036794 A1 | 3/2013 | |
| WO | 2013131047 | 9/2013 | |

OTHER PUBLICATIONS

Hwang, et al., "A High IIP2 Direct-Conversion Receiver using Even-Harmonic Reduction Technique for Cellular CDMA/PCS/GPS applications," IEEE Transaction on Circuits and Systems.
MSM6000 Chipset Solution, Qualcomm Incorporated.
MSM6500 Chipset Solution, Qualcomm Incorporated.
Sever et al. "A Dual-Antenna Phase-Array Ultra-Wideband CMOS Transceiver". IEEE Communications Magazine [Online] 2006, vol. 44, Issue 8, pp. 102-110. See pp. 104-107.
Winternitz, et al., "A GPS Receiver for High-Altitude Satellite Navigation," IEEE Journal of Selected Topics in Signal Processing, vol. 3, No. 4, pp. 541-556, Aug. 2009.
3GPP TS 36.101 V11.0.0, 3rd Generation Partnership Project; Technical Specification Group Radio Access Network; Evolved Universal Terrestrial Radio Access (E-UTRA);User Equipment (UE) radio transmission and reception (Release 11), Mar. 2012.
Broyde F., et al., "The Noise Performance of aMultiple-Input-Port and Multiple-Output-Port Low-Noise Amplifier Connected to an Array of Coupled Antennas," International Journal of Antennas and Propagation, vol. 2011, Article ID 438478, Jul. 18, 2011, 12 pages.
Chen, et al, "A 5-6 GHz 1-V CMOS Direct-Conversion Receiver With an Integrated Quadrature Coupler," IEEE Journal of Solid-State Circuits, vol. 42, No. 9, 2007, pp. 1963-1975.
Chen, et al., "A monolithic 5.9-GHz CMOS I/Q direct-down converter utilizing a quadrature coupler and transformer-coupled subharmonic mixers," Microwave and Wireless Components Letters, IEEE, vol. 16, No. 4, 2006, pp. 197-199.

Garuda, et al., "A Multi-band CMOS RF Front-end for 4G WiMAX and WLAN Applications," 2006 IEEE International Symposium on Circuits and Systes, 2006. ISCAS 2006. May 2006, 4 pages.
Hashemi, et al., "Concurrent Multiband Low-Noise Amplifiers—Theory, Design, and Applications," IEEE Transactions on Microwave Theory and Techniques, vol. 50, No. 1, Jan. 2002.
Henrik M et al., "A Full Duplex Front End Module for WiFi 802.11.n Applications", European Microwave Association, vol. 12, No. 4, Oct. 2008, pp. 162-165.
International Search Report and Written Opinion—PCT/US2012/038453—ISA/EPO—Oct. 5, 2012.
Jones W. W., et al., "Narrowband interference suppression using filter-bank analysis/synthesis techniques", Military Communications Conference, 1992. MILCOM '92, Conference REC0R D. Communications—Fusing Command, Control and Intelligence., IEEE San Diego, CA, USA, Oct. 11 14, 1992, NY, USA, IEEE, US, Oct. 11, 1992, pp. 898-902, XP010060840, DOI: 10.1109/MILCOM.1992. 243977, ISBN: 978-0-7803-0585-4.
Jussi R et al., "A Dual-Band RF Front-End for WCDMA and GSM Applications", IEEE, Journal Solid-State Circuits, 2001, vol. 36, No. 8, pp. 1198-1204.
Kevin W et al., "3G/4G Multimode Cellular Front End Challenges", Part 2: Architecture Discussion, RFMD® White Paper, 9 pages.
Kim, T.W., et al., Highly Linear Receiver Front-End Adopting MOSFET Transconductance Linearization by Multiple Gated Transistors, IEEE Journal of Solid-State Circuits, United States, IEEE, Jan. 1, 2004, vol. 39, No. 1, pp. 223-229.
Lai, C.M.,et al., "Compact router transceiver architecture for carrier aggregation systems", Microwave Conference (EUMC), 2011 41st European, IEEE, Oct. 10, 2011, pp. 693-696, XP032072825, ISBN: 978-1-61284-235-6 the whole document.
Lee et al., "Development of Miniature Quad SAW filter bank based on PCB substrate", IEEE Intl Frequency Control Symp, pp. 146-149, 2007.
Partial International Search Report—PCT/US2012/038453—ISA/EPO—Aug. 21, 2012.
Philips: "Capabilities of multi-transceiver UES", 3GPP Draft; R1-103913, 3rd Generation Partnership Project (3GPP), Mobile Competence Centre; 650, Route des Lucioles; F-06921 Sophia-Antipolis Cedex; France, vol. RAN WG1, no. Dresden, Germany; Jun. 22, 2010, XP050449298, [retrieved on Jun. 22, 2010] the whole document.
Pitschi M. et al., "High Performance Microwave Acoustic Components for Mobile Radios", Ultrasonics Symposium (IUS), 2009 IEEE International, EPCOS AG, Munich, Germany, vol. 1, Sep. 20-23, 2009.
Qualcomm Europe: "UE Implementation Impact due to 4C-HSDPA Operation", 3GPP Draft; R1-094067_UE_IMPL_Impact_4C_HSDPA, 3rd Generation Partnership Project (3GPP), Mobile Competence Centre ; 650, Route des Luci0les ; F-06921 Sophia-Antipolis Cedex ; France, no. Miyazaki; Oct. 12, 2009, XP050388547, [retrieved on Oct. 6, 2009].
Rahn D.G., et al., "A fully integrated multiband MIMO WLAN transceiver RFIC," IEEE J. Solid-State Circuits, 2005, vol. 40 (8), 1629-1641.
Tasic A. et al., "Design of Adaptive Multimode RF Front-End Circuits", IEEE Journal of Solid-State Circuits, vol. 42, Issue 2, Feb. 2007 pp. 313-322.
"UMTS Picocell Front End Module", CTS Corp. 8 pages.

* cited by examiner

NON-ADJACENT CARRIER AGGREGATION ARCHITECTURE

RELATED APPLICATIONS

This application is related to and claims priority from U.S. Provisional Patent Application Ser. No. 61/487,172 filed May 17, 2011, for "NON-ADJACENT CARRIER AGGREGATION IN A MOBILE DEVICE."

TECHNICAL FIELD

The present disclosure relates generally to wireless devices for communication systems. More specifically, the present disclosure relates to systems and methods for a non-adjacent carrier aggregation architecture.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

These electronic devices may communicate wirelessly with each other and with a network. As the demand for information by these electronic devices has increased, the downlink throughput has also increased. One such way to increase downlink throughput is the use of carrier aggregation. In carrier aggregation, multiple carriers may be aggregated on the physical layer to provide the required bandwidth (and thus the required throughput).

It may be desirable for an electronic device to maximize battery life. Because an electronic device often runs on a battery with a limited operation time, reductions in the power consumption of an electronic device may increase the desirability and functionality of the electronic device.

The electronic devices have also become smaller and cheaper. To facilitate both the decrease in size and the decrease in cost, additional circuitry and more complex circuitry are being used on integrated circuits. Thus, any reduction in the die area used by circuitry may reduce both the size and cost of an electronic device. Benefits may be realized by improvements to electronic devices that allow an electronic device to participate in carrier aggregation while minimizing the cost and size of the electronic device while also minimizing the power consumption of the electronic device.

SUMMARY

A wireless communication device configured for providing carrier aggregation is described. The wireless communication device includes at least one antenna configured to receive a plurality of wireless signals. The wireless communication device also includes a first transceiver that includes a first downconverting circuitry. The wireless communication device further includes a second transceiver that includes a second downconverting circuitry. The wireless communication device also includes an inter-transceiver connection that routes a first signal from a low noise amplifier on the first transceiver to the second downconverting circuitry of the second transceiver.

The inter-transceiver connection may be coupled to an output of the low noise amplifier on the first transceiver. The inter-transceiver connection may also route a second signal from a low noise amplifier on the second transceiver to the first downconverting circuitry of the first transceiver. The inter-transceiver connection may be coupled to an output of the low noise amplifier on the second transceiver. The inter-transceiver connection may include a switched connection coupled between outputs of low noise amplifiers on the first transceiver and the second transceiver and inputs of the first downconverting circuitry and the second downconverting circuitry.

The inter-transceiver connection may include a first line and a second line. The first line may be coupled between an output of a low noise amplifier on the first transceiver and an input of the second downconverting circuitry. The second line may be coupled between an output of a low noise amplifier on the second transceiver and an input of the first downconverting circuitry. The inter-transceiver connection may include additional low noise amplifiers, interconnects and switches that allow the inter-transceiver connection to have several configurations. The wireless communication device may not require four antennas, a power splitter or an external low noise amplifier.

A method for receiving a plurality of wireless signals is also described. A plurality of signals is wireless received. The plurality of signals is amplified. A first signal of the plurality of signals is provided to a first downconverter on a first transceiver. A second signal of the plurality of signals is provided to a second downconverter on a second transceiver. The first signal is processed using the first downconverter. The second signal is processed using the second downconverter.

An apparatus for receiving a plurality of wireless signals is described. The apparatus includes means for wirelessly receiving a plurality of signals. The apparatus also includes means for amplifying the plurality of signals. The apparatus further includes means for providing a first signal of the plurality of signals to a first downconverter on a first transceiver. The apparatus also includes means for providing a second signal of the plurality of signals to a second downconverter on a second transceiver. The apparatus further includes means for processing the first signal using the first downconverter. The apparatus also includes means for processing the second signal using the second downconverter.

DETAILED DESCRIPTION

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP LTE, a mobile station or device may be referred to as a "user equipment" (UE).

3GPP specifications are based on evolved Global System for Mobile Communications (GSM) specifications, which are generally known as the Universal Mobile Telecommunications System (UMTS). 3GPP standards are structured as releases. Discussion of 3GPP thus frequently refers to the functionality in one release or another. For example, Release 99 specifies the first UMTS third generation (3G) networks, incorporating a CDMA air interface. Release 6 integrates operation with wireless local area networks (LAN) and adds High Speed Uplink Packet Access (HSUPA). Release 8 introduces dual downlink carriers and Release 9 extends dual carrier operation to uplink for UMTS.

CDMA2000 is a family of $3^{rd}$ generation (3G) technology standards that use code division multiple access (CDMA) to send voice, data and signaling between wireless devices. CDMA2000 may include CDMA2000 1X, CDMA2000 EV-DO Rev. 0, CDMA2000 EV-DO Rev. A and CDMA2000 EV-DO Rev. B. 1× or 1×RTT refers to the core CDMA2000 wireless air interface standard. 1× more specifically refers to 1 times Radio Transmission Technology and indicates the same radio frequency (RF) bandwidth as used in IS-95. 1×RTT adds 64 additional traffic channels to the forward link. EV-DO refers to Evolution-Data Optimized. EV-DO is a telecommunications standard for the wireless transmission of data through radio signals.

Figure 1:
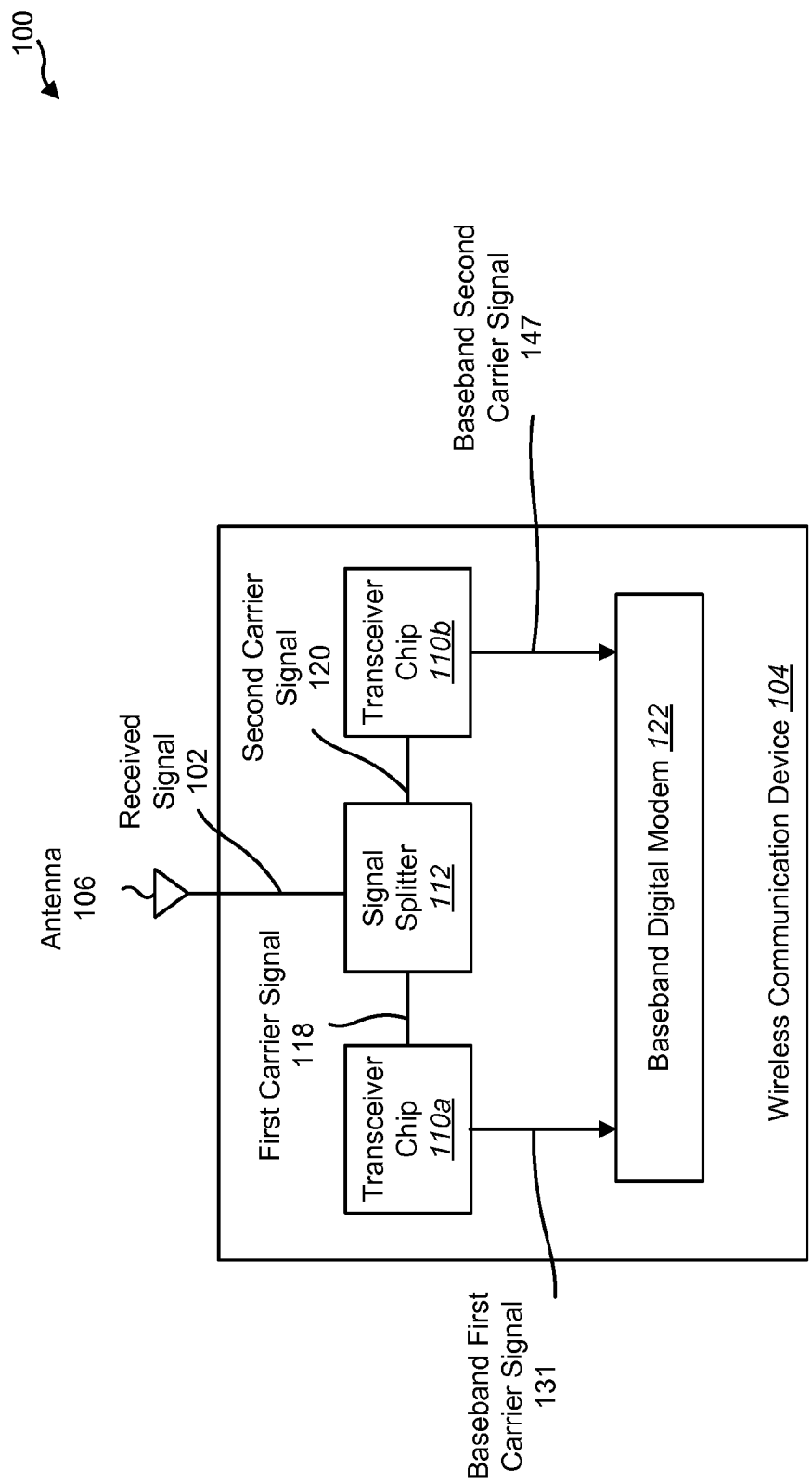
FIG. 1 shows a wireless communication device for use in the present systems and methods.

FIG. 1 shows a wireless communication device 104 for use in the present systems and methods. A wireless communication device 104 may also be referred to as, and may include some or all of the functionality of, a terminal, an access terminal, a user equipment (UE), a subscriber unit, a station, etc. A wireless communication device 104 may be a cellular phone, a personal digital assistant (PDA), a wireless device, a wireless modem, a handheld device, a laptop computer, a PC card, compact flash, an external or internal modem, a wireline phone, etc. A wireless communication device 104 may be mobile or stationary. A wireless communication device 104 may communicate with zero, one or multiple base stations on a downlink and/or an uplink at any given moment. The downlink (or forward link) refers to the communication link from a base station to a wireless communication device 104, and the uplink (or reverse link) refers to the communication link from a wireless communication device 104 to a base station. Uplink and downlink may refer to the communication link or to the carriers used for the communication link.

A wireless communication device 104 may operate in a wireless communication system 100 that includes other wireless devices, such as base stations. A base station is a station that communicates with one or more wireless communication devices 104. A base station may also be referred to as, and may include some or all of the functionality of, an access point, a broadcast transmitter, a Node B, an evolved Node B, etc. Each base station provides communication coverage for a particular geographic area. A base station may provide communication coverage for one or more wireless communication devices 104. The term "cell" can refer to a base station and/or its coverage area, depending on the context in which the term is used.

Communications in a wireless communication system 100 (e.g., a multiple-access system) may be achieved through transmissions over a wireless link. Such a communication link may be established via a single-input and single-output (SISO), multiple-input and single-output (MISO) or a multiple-input and multiple-output (MIMO) system. A multiple-input and multiple-output (MIMO) system includes transmitter(s) and receiver(s) equipped, respectively, with multiple (NT) transmit antennas and multiple (NR) receive antennas for data transmission. SISO and MISO systems are particular instances of a multiple-input and multiple-output (MIMO) system. The multiple-input and multiple-output (MIMO) system can provide improved performance (e.g., higher throughput, greater capacity or improved reliability) if the additional dimensionalities created by the multiple transmit and receive antennas are utilized.

The wireless communication system 100 may utilize both single-input and multiple-output (SIMO) and multiple-input and multiple-output (MIMO). The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems, spatial division multiple access (SDMA) systems and Evolved High-Speed Packet Access (HSPA+) systems.

The wireless communication device 104 may receive wireless/radio frequency (RF) signals over different carrier frequencies in different bands. Because a single carrier frequency on a single band may not meet the ever-increasing demand for bandwidth by devices communication within a wireless communication system 100, carrier frequencies on different bands can be utilized by a single wireless communication device 104 simultaneously. In other words, a wireless communication device 104 can tune into a first carrier frequency on a first band and a second carrier frequency on a second band simultaneously. This functionality, known as carrier aggregation on separate bands, enables a wireless communication device 104 to communicate using a combined bandwidth that is greater than the separate bands individually. Thus, the wireless communication device 104 may be capable of carrier aggregation on separate bands.

The wireless communication device 104 may include one or more antennas 106. The antennas 106 may receive a received signal 102. In one configuration, the received signal 102 may include a signal on a first carrier frequency and a signal on a second carrier frequency. The first carrier frequency and the second carrier frequency may be in different bands. The received signal 102 may include additional signals on additional carrier frequencies, within the same band as the first carrier frequency or the second carrier frequency or within a different band.

The wireless communication device 104 may include a signal splitter 112. In one configuration, the signal splitter 112 may be before a first transceiver chip 110a and a second transceiver chip 110b within a receive (Rx) chain on the wireless communication device 104. In this case, the signal splitter 112 may be a multiplexer such as a quad-plexer. In another configuration, the signal splitter 112 may be located within one of the transceiver chips 110.

The first transceiver chip 110a may be coupled to one of the antennas 106. The first transceiver chip 110a may include a transmitter and a receiver (that includes downconverting circuitry to convert signals to baseband). The first transceiver chip 110a may receive a first carrier signal 118 and output a baseband first carrier signal 131 to a baseband digital modem 122. The second transceiver chip 110b may also be coupled to an antenna 106. In one configuration, the second transceiver chip 110b may be coupled to the same antenna 106 as the first transceiver chip 110a. The second transceiver chip 110b may also include a transmitter and a receiver (with downconverting circuitry). The second transceiver chip 110b may receive a second carrier signal 120 and output a baseband second carrier signal 147 to the baseband digital modem 122. A carrier signal may refer to the carrier frequency used by the signal.

When the signal splitter 112 is located within one of the transceiver chips 110, only that transceiver chip 110 may receive the received signal 102 from the antenna 106. Within the transceiver chip 110 receiving the received signal 102, the received signal 102 may be split and passed to the other transceiver chip 110.

The baseband digital modem 122 may perform processing on the baseband first carrier signal 131 and the baseband second carrier signal 147. For example, the baseband digital modem 122 may convert the signals to the digital domain using analog-to-digital converters (ADCs) and perform digital processing on the signals using digital signal processors (DSPs). In one configuration, the first carrier signal 118 may be located in the low band while the second carrier signal 120 is located within the midband. This may be referred to as inter-band operation or Dual-Band 4-Carrier according to Rel-10.

The first transceiver chip 110a and the second transceiver chip 110b may use a dual-band multi-carrier aggregation configuration. The dual-band multi-carrier aggregation configuration may require die-to-die signal routing, thus requiring that the first transceiver chip 110a and the second transceiver chip 110b are located proximate to each other. In dual-band multi-carrier aggregation, two separate sets are used. Each set is a group of adjacent carriers. Thus, a first carrier may actually be a first group of adjacent carriers and a second carrier may actually be a second group of adjacent carriers. The first carrier and the second carrier may be non-adjacent in the same frequency band. A group of adjacent carriers in a set may be two or more carriers. Each set may have a different number of carriers.

Figure 2:
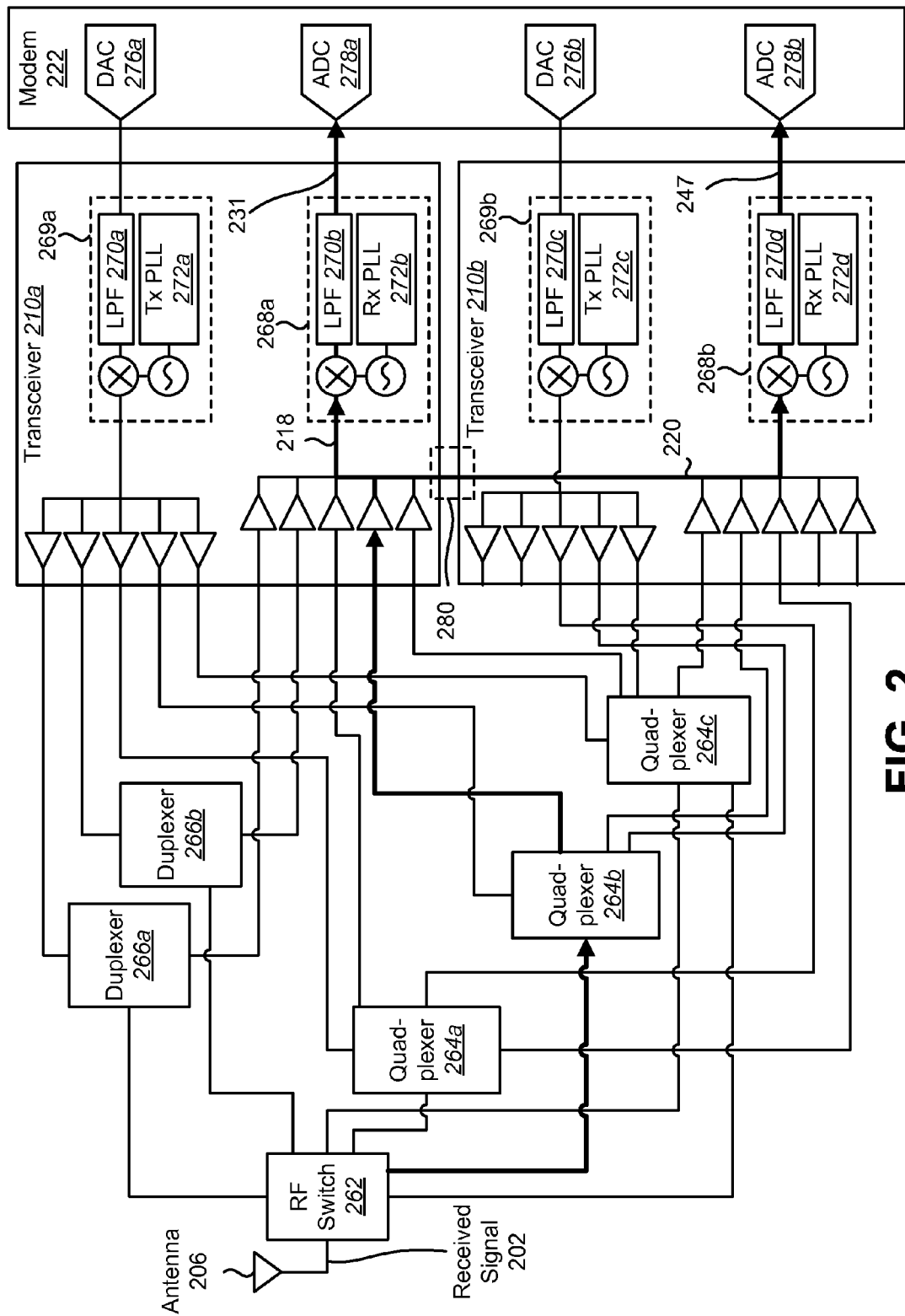
FIG. 2 is a block diagram illustrating an architecture configured to provide aggregation of non-adjacent carrier frequencies on a single band, as well as aggregation of carrier frequencies on a different band.

FIG. 2 is a block diagram illustrating an architecture configured to provide aggregation of non-adjacent carrier frequencies on a single band, as well as aggregation of carrier frequencies on a different band. The architecture may be implemented within a wireless communication device 104.

The architecture is an example, and components illustrated in the architecture may be combined and/or separated into different integrated circuits (ICs), depending on manufacturing concerns, desired functionality and/or other factors. In the architecture illustrated, only two synthesizers are running with only minor degradation in noise factor (NF). Furthermore, in the architecture illustrated, there is no need for external low noise amplifiers (LNAs).

The architecture may include one or more antennas 206. The one or more antennas 206 may receive wireless/radio frequency (RF) signals from different carrier frequencies in different bands and provide corresponding electrical received signals 202 to an RF switch 262. The RF switch 262 may relay the electrical signals to one or more multiplexers/demultiplexers, such as duplexers 266a-b and quad-plexers 264a-c. The multiplexers/demultiplexers may route the received signal to a first transceiver 210a. The architecture may process signals from non-adjacent carrier frequencies on the single band with little added cost and/or complexity compared to circuits enabled to aggregate carrier frequencies on different bands. The multiplexers/demultiplexers shown may be replaced with other filtering blocks.

The manner in which the signals are routed may depend on the band (e.g., low band or midband) from which the signals were received. Because each band may have a single carrier frequency, each corresponding signal may be routed differently. For example, the RF switch 262 may provide combined signals from a first band (with a frequency between 1930 megahertz (MHz) and 1990 MHz) on a single line to a quad-plexer 264b. Because the combined signals correspond to a single band, the quad-plexer 264b may route the combined signal on a single line to the first transceiver 210a, configured to process signals from the first band. After passing through a low noise amplifier (LNA) of the first transceiver 210a, the combined signal is split into a first carrier signal 218 and a second carrier signal 220. The first carrier signal 218 is provided to downconverting circuitry 268a of the first transceiver 210a, configured to process signals within the band of the first carrier signal 218. The second carrier signal 220 is provided to downconverting circuitry 268b of the second transceiver 210b via the inter-transceiver connection 280. The downconverting circuitry 268b of the second transceiver 210b may be configured to process signals within the band of the second carrier signal 220. The first transceiver 210a and the second transceiver 210b may each be configured to process a different signal, enabling aggregation of signals from the different carrier frequencies.

Each transceiver 210 may include circuitry to process the signals prior to providing the signals to a modem 222 (where the received signals may be converted from digital signals to analog signals using analog-to-digital converters (ADCs) 278a-b or where transmit signals may be converted from digital signals to analog signals using digital-to-analog converters (DACs) 276a-b). The circuitry in a transceiver 210 may include low noise amplifiers (LNAs), other amplifiers or amplifying circuitry for each input and downconverting circuitry 268a-b. Because a transceiver 210 may also have transmission capabilities, a transceiver 210 may also include upconverting circuitry 269a-b and low noise amplifiers (LNAs) for outgoing signals provided by the DACs 276a-b.

Downconverting circuitry 268-b, which can remove a carrier frequency from a signal and/or perform other functions to prepare the signal for conversion to digital, may vary in numerous ways. These variations may depend on the desired functionality, manufacturing concerns, etc. For example, both the downconverting circuitry 268 and the upconverting circuitry 269 may include a mixer, a phase locked loop (PLL)

272a-d, an oscillator and a low pass filter (LPF) 270a-d. The downconverting circuitry 268 may be configured to receive inputs from any of a variety of bands. Thus, the downconverting circuitry 268 may be capable of processing signals corresponding to numerous carrier frequencies.

As discussed above, the architecture may include an inter-transceiver connection 280 that routes the second carrier signal 220 from the first transceiver 210a to downconverting circuitry 268b of the second transceiver 210b. The inter-transceiver connection 280 may allow the architecture to process signals from non-adjacent carrier frequencies on a single band with little added cost and/or complexity to an architecture enabled to process aggregate carrier frequencies on different bands. The inter-transceiver connection 280 may be any type of interconnect, such as a simple trace (or other signal conduit) on a printed circuit board (PCB) and/or in an integrated circuit, depending on whether the first transceiver 210a and the second transceiver 210b are integrated into a single IC or separate ICs. If the first transceiver 210a and the second transceiver 210b are integrated into separate ICs, the separate ICs may need to be proximately close to each other to facilitate the inter-transceiver connection 280. The inter-transceiver connection 280 may also be referred to as die-to-die signal routing.

In one configuration, the one or more antennas 206 may receive signals corresponding to two carrier frequencies in a single band. Thus, the architecture of FIG. 2 may aggregate non-adjacent carrier frequencies on a single band as well as carrier frequencies on different bands. The combined signals may be routed to the RF switch 262. The RF switch 262 may then provide the combined signals on a single line to a quad-plexer 264b that routes the combined signals on a single line to the first transceiver 210a, which is configured to process the signals from the single band. After passing through a low noise amplifier (LNA) on the first transceiver 210a, the signal may be split into a first carrier signal 218 and a second carrier signal 220 (the signals may be non-adjacent carrier frequencies within a single band). The first carrier signal 218 may be provided to the downconverting circuitry 268a of the first transceiver 210a. The second carrier signal 220 may be provided to the downconverting circuitry 268b of the second transceiver 210b via the inter-transceiver connection 280. Each transceiver 210 may be configured to process a different signal, thereby enabling the aggregation of signals from the different carrier frequencies. The downconverting circuitry 268a on the first transceiver 210a may output a baseband first carrier signal 231 to an analog-to-digital converter (ADC) 278a on the modem 222. The downconverting circuitry 268b on the second transceiver 210b may output a baseband second carrier signal 247 to an analog-to-digital converter (ADC) 278b on the modem 222.

The use of an inter-transceiver connection 280 may side-step other solutions for processing signals from non-adjacent carrier frequencies on a single band that can be more complex and/or costly. The inter-transceiver connection 280 may, for example, prevent the need to use low noise amplifiers (LNAs) and signal splitters external to the transceivers 210 to route the different signals of the same band to the inputs of the transceivers 210. Thus, the additional components as well as the additional routing lines interconnecting these additional components may be avoided. The inter-transceiver connection 280 may also prevent the need to introduce extra downconverting circuitry into one or both of the transceivers 210 that would otherwise increase the die area of the affected transceivers 210.

Figure 3:
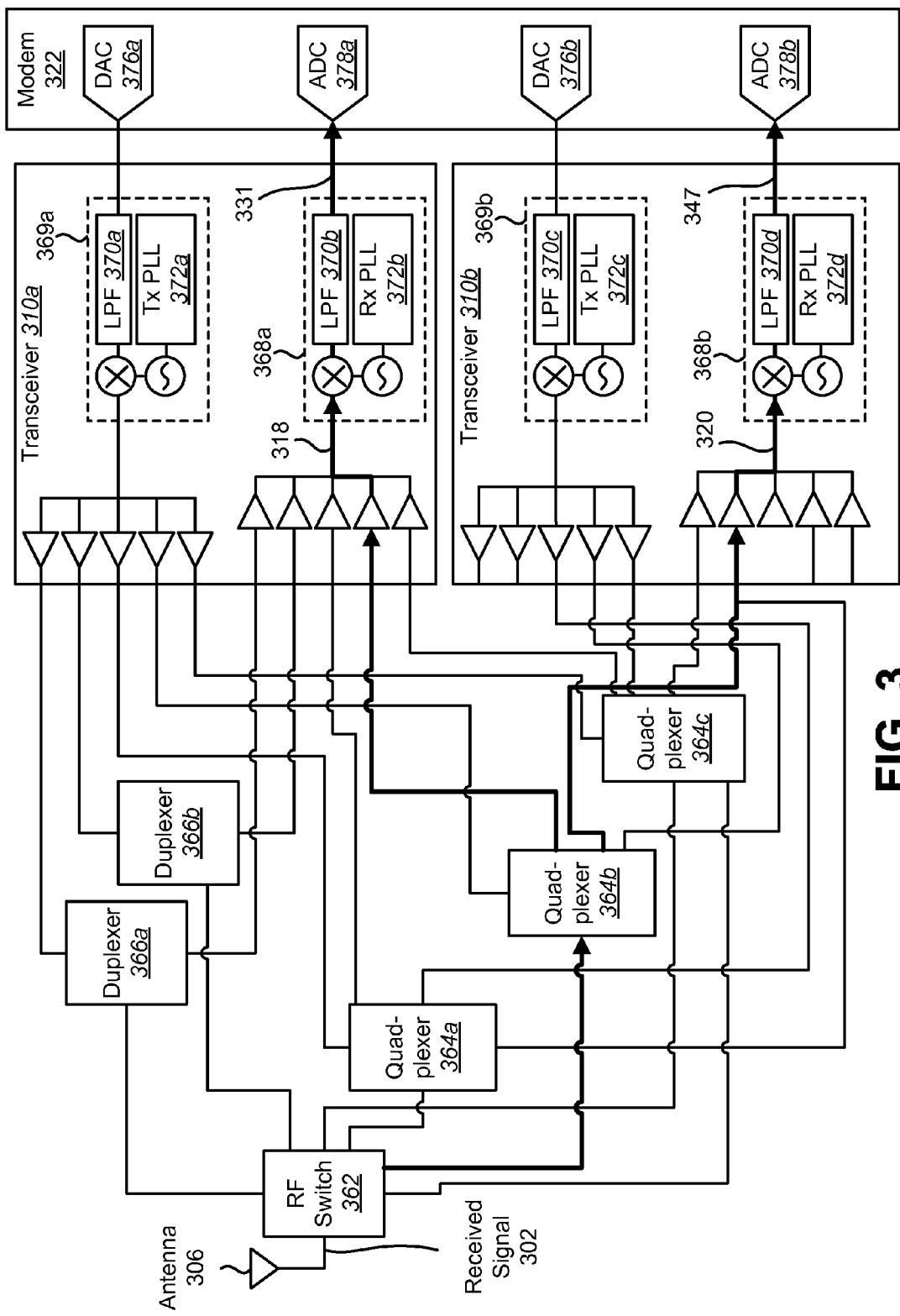
FIG. 3 is a block diagram illustrating an architecture configured to provide carrier aggregation on separate bands.

FIG. 3 is a block diagram illustrating an architecture configured to provide carrier aggregation on separate bands. The architecture of FIG. 3 may be used within a wireless communication device 104. The architecture is an example, and components illustrated in the architecture may be combined and/or separated into different integrated circuits (ICs), depending on manufacturing concerns, desired functionality and/or other factors. In the architecture illustrated, only two synthesizers are running with only minor degradation in noise factor (NF). Furthermore, in the architecture illustrated, there is no need for external low noise amplifiers (LNAs).

The architecture may include one or more antennas 306. The one or more antennas 306 may receive wireless/radio frequency (RF) signals from different carrier frequencies in different bands and provide corresponding electrical received signals 302 to an RF switch 362. The RF switch 362 may relay the electrical signals to one or more multiplexers/demultiplexers, such as duplexers 366a-b and quad-plexers 364a-c. One of the multiplexers/demultiplexers may act as the signal splitter 112. The multiplexers/demultiplexer acting as the signal splitter 112 may separate the signals of each carrier, and these signals may each be routed to a different transceiver 310a-b. The multiplexers/demultiplexers shown may be replaced with other filtering blocks.

The manner in which the signals are routed may depend on the band (e.g., low band or midband) from which the signals were received. Because each band may have a single carrier frequency, each corresponding signal may be routed differently. For example, the RF switch 362 may provide combined signals from a first band (with a frequency between 1930 megahertz (MHz) and 1990 MHz) and a second band (with a frequency between 2110 MHz and 2155 MHz) on a single line to a quad-plexer 364b, which splits the combined signals into separate signals. The signals may then be routed on different lines: one line for the received signal on the first band and another line for the received signal on the second band. Thus, the received signal on the first band (i.e., the first carrier signal 318) may be routed to the first transceiver 310a while the received signal on the second band (i.e., the second carrier signal 320) may be routed to the second transceiver 310b. For example, the first transceiver 310a may have inputs to receive signals from bands 1, 2, 5, 9 and 17 while the second transceiver 310b has inputs to receive signals from bands 4, 8 and 13.

Each transceiver 310 may include circuitry to process the signals prior to providing the signals to a modem 322 (where the received signals may be converted from digital signals to analog signals using analog-to-digital converters (ADCs) 378a-b or where transmit signals may be converted from digital signals to analog signals using digital-to-analog converters (DACs) 376a-b. The circuitry in a transceiver 310 may include low noise amplifiers (LNAs), other amplifiers or amplifying circuitry for each input and downconverting circuitry 368a-b. Because a transceiver 310 may also have transmission capabilities, a transceiver 310 may also include upconverting circuitry 369a-b and low noise amplifiers (LNAs) for outgoing signals provided by the digital-to-analog converters (DACs) 376a-b.

Downconverting circuitry 368a-b, which can remove a carrier frequency from a signal and/or perform other functions to prepare the signal 331, 347 for conversion to digital, may vary in numerous ways. These variations may depend on the desired functionality, manufacturing concerns, etc. For example, both the downconverting circuitry 368 and the upconverting circuitry 369 may include a mixer, a phase locked loop (PLL) 372a-d, an oscillator and a low pass filter (LPF) 370a-d. The downconverting circuitry 368 may be configured to receive inputs from any of a variety of bands.

Thus, the downconverting circuitry 368 may be capable of processing signals corresponding to numerous carrier frequencies.

Figure 4:
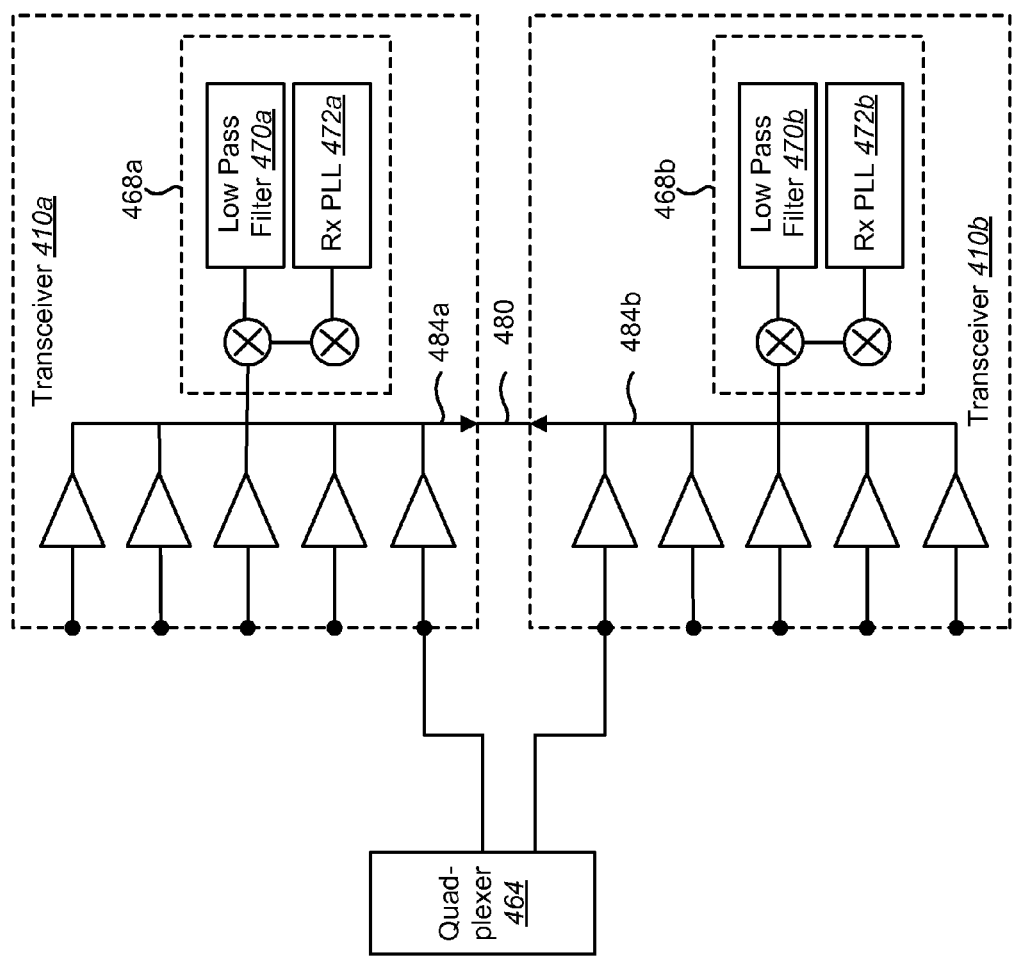
FIG. 4 is a block diagram illustrating one configuration of how the output of a low noise amplifier (LNA) on a transceiver can be connected to the downconverting circuitry of another transceiver.

FIG. 4 is a block diagram illustrating one configuration of how the output of a low noise amplifier (LNA) on a transceiver 410a-b can be connected to the downconverting circuitry 468a-b of another transceiver 410a-b. For simplicity, only portions of the first transceiver 410a and the second transceiver 410b and only one quad-plexer 464 are illustrated. A switched connection 484a-b may be coupled between the output of the low noise amplifiers (LNAs) and the input of each downconverting circuitry 468a-b. Each downconverting circuitry 468 may include a low pass filter 470a-b and a phase locked loop (PLL) 472a-b. The switched connection 484a-b (one configuration of the signal splitter 112) may include switches that can enable the inter-transceiver connection 480 when needed and disable the inter-transceiver connection 480 when not needed.

The quad-plexer 464 may route signals differently, depending on the band in which the signals are transmitted. If two carrier frequencies are provided on a first band, the quad-plexer 464 may provide the corresponding signals on a first line to the first transceiver 410a. The first transceiver 410a may then route the signals to the second transceiver 410b using the inter-transceiver connection 480. Thus, signals from both of the carrier frequencies may each be processed, each by a different transceiver 410. Similarly, if two carrier frequencies are provided on a second band, the quad-plexer 464 may provide the corresponding signals to the second transceiver 410b. The second transceiver 410b may then route the signals to the first transceiver 410a. Thus, the architecture can provide non-adjacent carrier aggregation for signals in any band routed to the transceivers 410.

Figure 5:
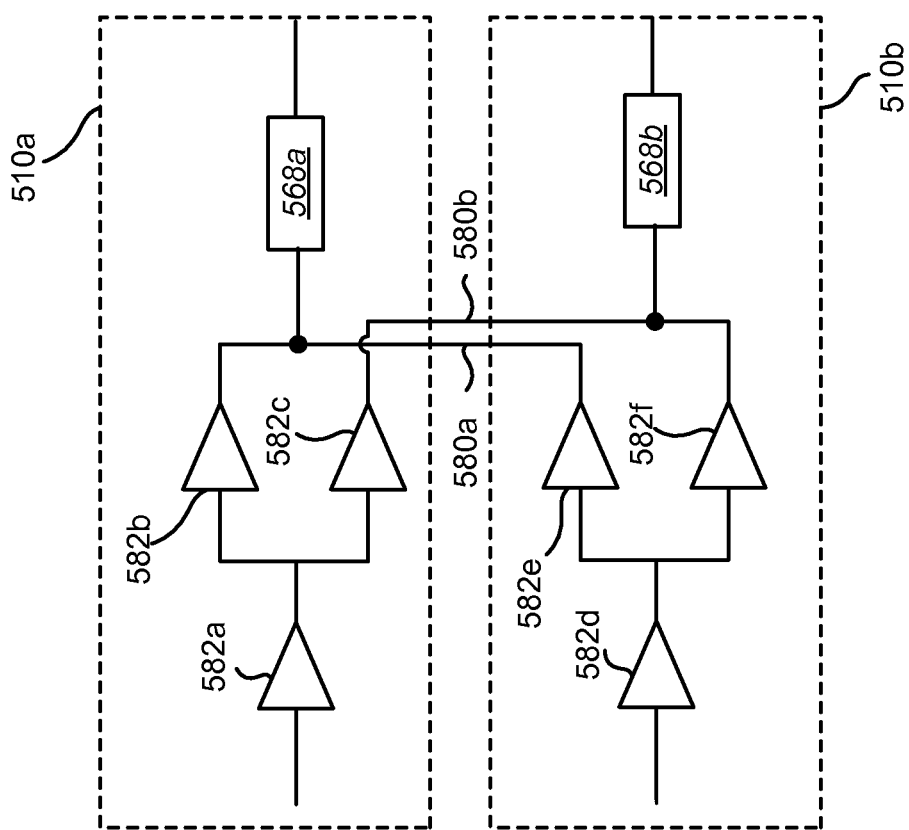
FIG. 5 is a block diagram illustrating another configuration of how the output of a low noise amplifier (LNA) on a transceiver can be connected to the downconverting circuitry of another transceiver.

FIG. 5 is a block diagram illustrating another configuration of how the output of a low noise amplifier (LNA) 582a-f on a transceiver 510 can be connected to the downconverting circuitry 568a-b of another transceiver 510. The first transceiver 510a may include downconverting circuitry 568a. The second transceiver 510b may also include downconverting circuitry 568b. Additional low noise amplifiers (LNAs) 582b-c, 582e-f and two separate lines 580a-b may be added that connect the outputs of the additional low noise amplifiers (LNAs) 582c, 582f directly to the downconverting circuitry 568a-b. The separate lines 580a-b may be one configuration of the signal splitter 112 of FIG. 1.

The type of inter-transceiver connection 580 utilized may depend on the circuitry involved. For example, simple electrical shorts can be utilized where the downconverting circuitry 568 includes a current-driven input, such as current-driven mixers. A switched connection may be used where the downconverting circuitry 568 is partly or wholly voltage driven, requiring a specific impedance on the input. Where an input impedance is required, the switched connection may provide the necessary impedance to provide the desired functionality.

Figure 6:
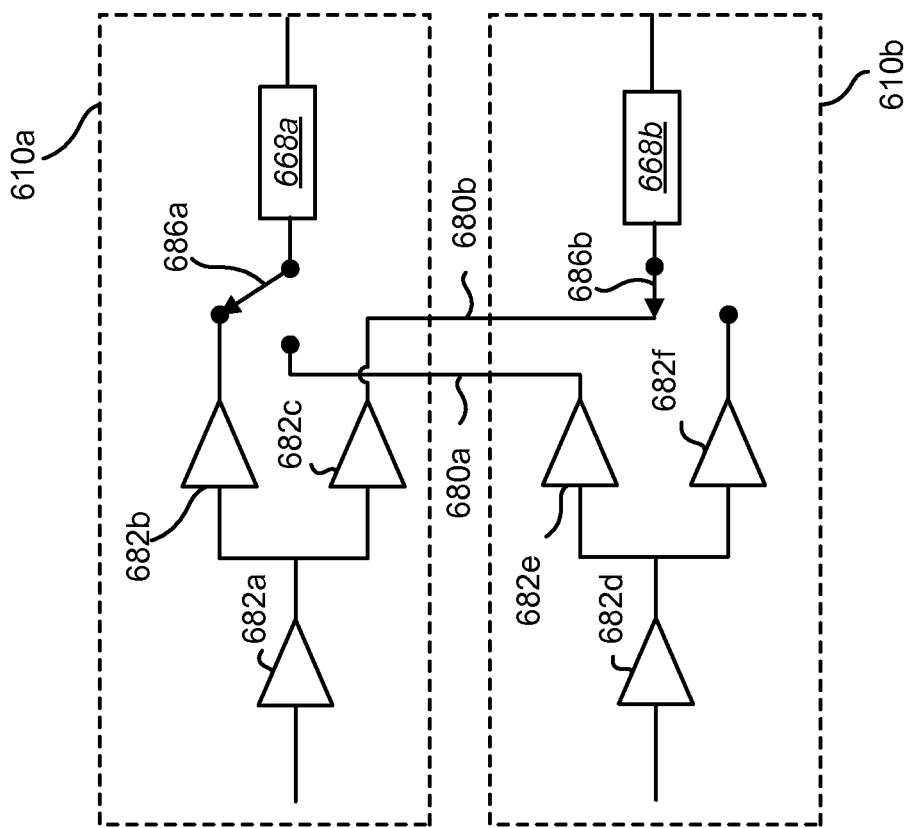
FIG. 6 is a block diagram illustrating yet another configuration of how the output of a low noise amplifier (LNA) on a transceiver can be connected to the downconverting circuitry of another transceiver.

FIG. 6 is a block diagram illustrating yet another configuration of how the output of a low noise amplifier (LNA) 682 on a transceiver 610 can be connected to the downconverting circuitry 668a-b of another transceiver 610. A first transceiver 610a and a second transceiver 610b are shown. Additional low noise amplifiers (LNAs) 682a-f, interconnects 680a-b and switches 686a-b may be used to create an inter-transceiver connection 280 that has several configurations. The switches 686a-b may be one configuration of the signal splitter 112 of FIG. 1. In a first configuration, both the first switch 686a and the second switch 686b may be positioned upward to route an input signal from the first transceiver 610a to the downconverting circuitry 668a of the first transceiver 610a and the downconverting circuitry 668b of the second transceiver 610b. In a second configuration, both the first switch 686a and the second switch 686b can be positioned downward to route a signal from the second transceiver 610b to the downconverting circuitry 668a of the first transceiver 610a and the downconverting circuitry 668b of the second transceiver 610b. In a third configuration, the switches 686a-b may be configured such that the input signal of each transceiver 610 is routed to the downconverting circuitry 668 of that transceiver 610.

Figure 7:
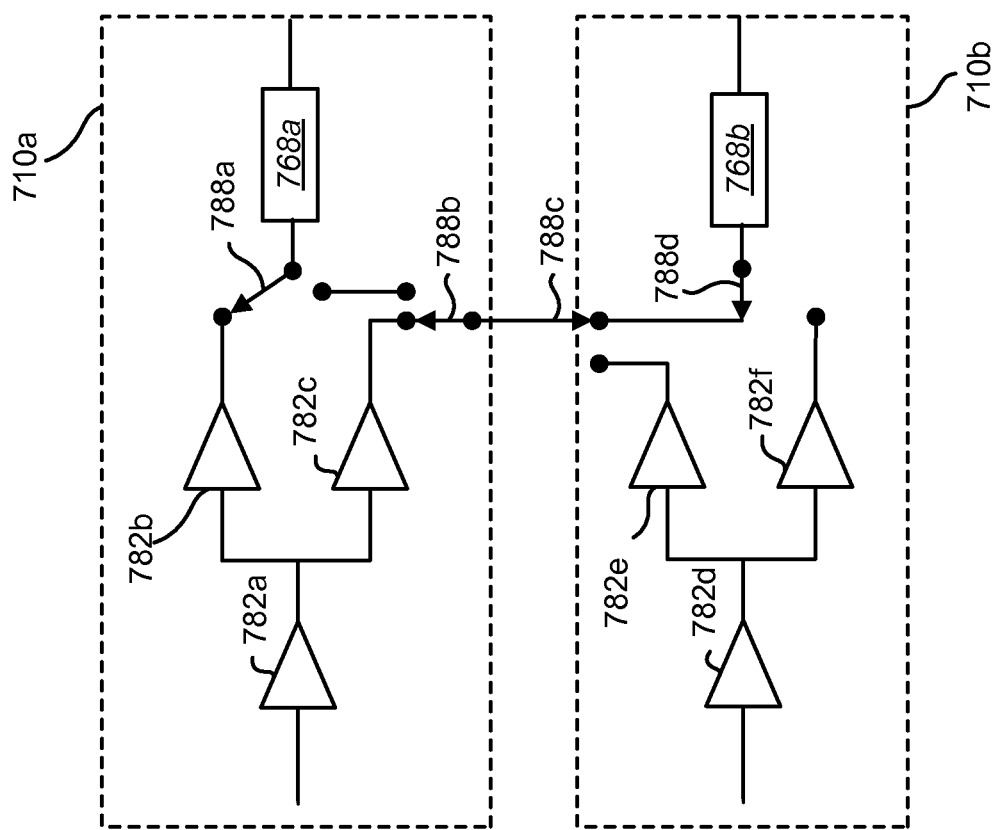
FIG. 7 is a block diagram illustrating another configuration of how the output of a low noise amplifier (LNA) on a transceiver can be connected to the downconverting circuitry of another transceiver.

FIG. 7 is a block diagram illustrating another configuration of how the output of a low noise amplifier (LNA) 782a-f on a transceiver 710 can be connected to the downconverting circuitry 768a-b of another transceiver 710. A first transceiver 710a and a second transceiver 710b are shown. Additional low noise amplifiers (LNAs) 782a-f, interconnects and switches 788a-d may be used to create an inter-transceiver connection 280 with several configurations. The additional switches 788a-d may enable the use of a single inter-transceiver interconnect 280. The additional switches 788a-d may be one configuration of the signal splitter 112 of FIG. 1.

Figure 8:
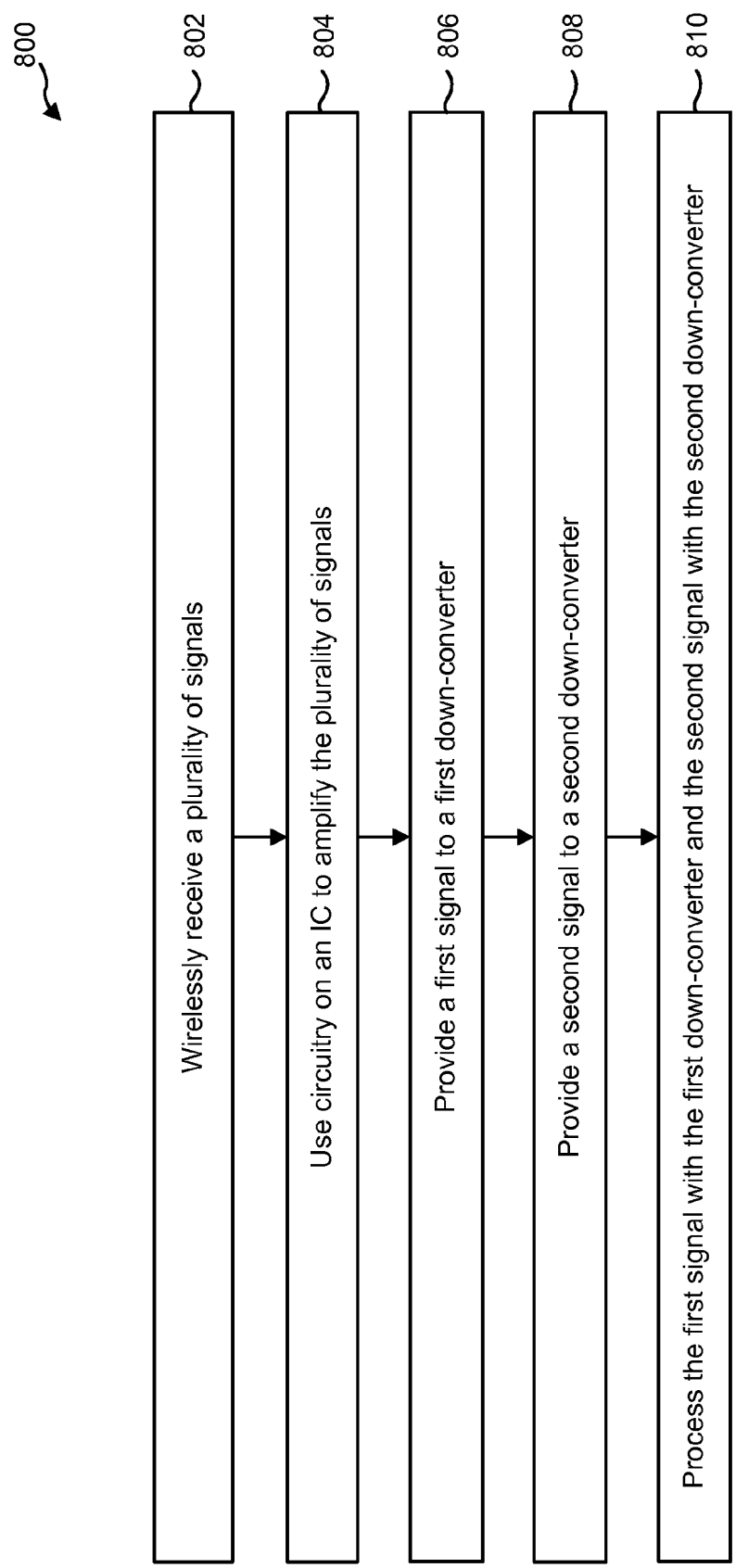
FIG. 8 is a flow diagram of a method for aggregating multiple carrier frequencies on a single band.

FIG. 8 is a flow diagram of a method 800 for aggregating multiple carrier frequencies on a single band. The method 800 may be performed by a wireless communication device 104. The wireless communication device 104 may wirelessly receive 802 a plurality of signals. Each of the plurality of signals may correspond to a different carrier frequency. Each carrier frequency may include a finite bandwidth, which can be different than the bandwidth of one or more other carrier frequencies received.

The plurality of signals may be amplified 804 using an integrated circuit (IC). A first signal 118 may be provided 806 to a first downconverter 268a on the integrated circuit (IC). A second signal 120 may be provided 808 to a second downconverter 268b on the integrated circuit (IC). In one configuration, the first downconverter 268a may be on a first transceiver 210a and the second downconverter 268b may be on a second transceiver 210b. The first signal 118 may be processed 810 with the first downconverter 268a and the second signal 120 may be processed 810 with the second downconverter 268b. Each of these processed signals may be provided to separate analog-to-digital converters (ADCs) 278. Additional downconverters 268 may be used to process additional signals.

Figure 9:
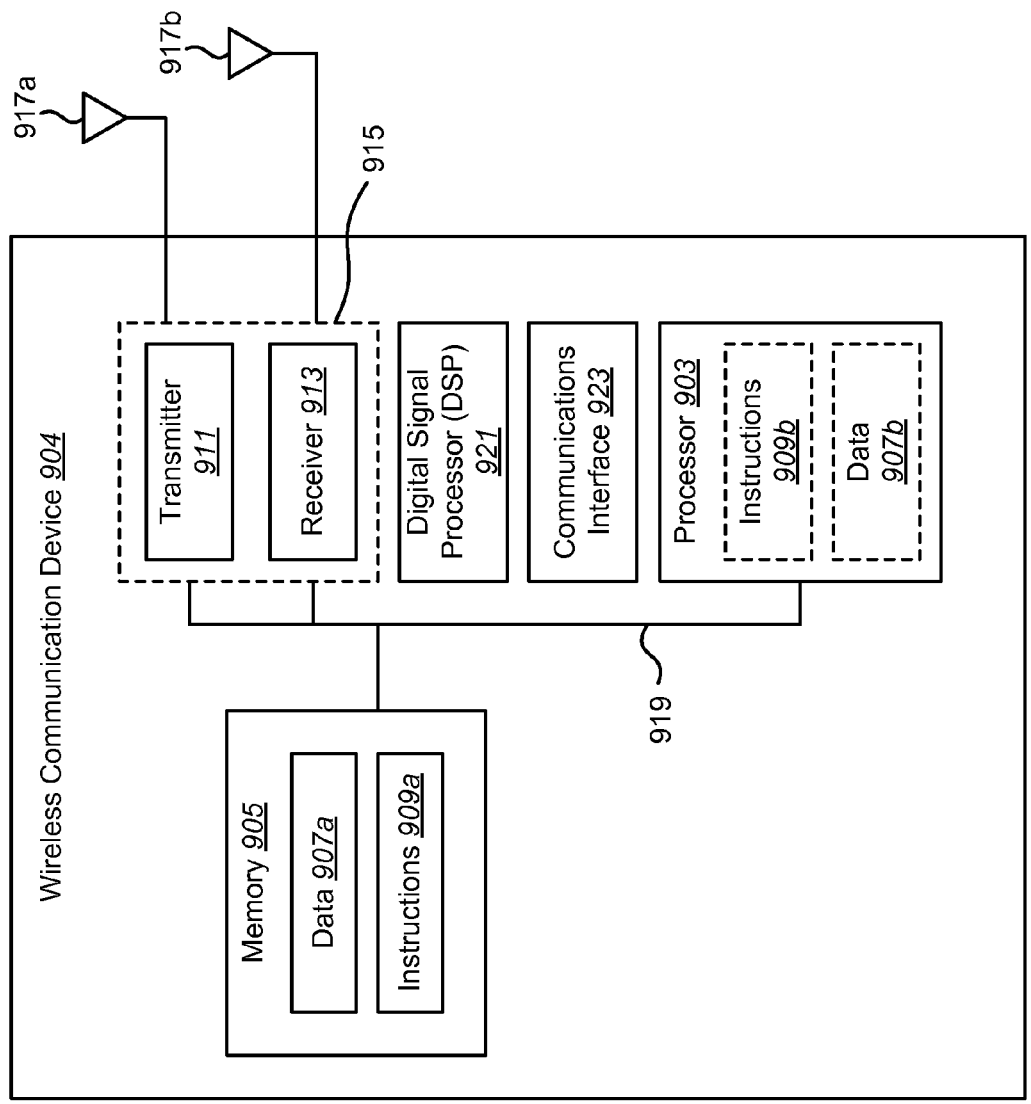
FIG. 9 illustrates certain components that may be included within a wireless communication device.

FIG. 9 illustrates certain components that may be included within a wireless communication device 904. The wireless communication device 904 may be an access terminal, a mobile station, a user equipment (UE), etc. The wireless communication device 904 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the wireless communication device 904 of FIG. 9, in an alternative configuration, a combination of processors (e.g., an ARM and DSP) could be used.

The wireless communication device 904 also includes memory 905. The memory 905 may be any electronic component capable of storing electronic information. The memory 905 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof Data 907a and instructions 909a may be stored in the memory 905. The instructions 909a may be executable by the processor 903 to implement the methods disclosed herein. Executing the instructions 909a may involve the use of the data 907a that is stored in the memory 905. When the processor 903 executes the instructions 909, various portions of the instructions 909b may be loaded onto the processor 903, and various pieces of data 907b may be loaded onto the processor 903.

The wireless communication device 904 may also include a transmitter 911 and a receiver 913 to allow transmission and reception of signals to and from the wireless communication device 904 via a first antenna 917a and a second antenna 917b. The transmitter 911 and receiver 913 may be collectively referred to as a transceiver 915. The wireless communication device 904 may also include (not shown) multiple transmitters, additional antennas, multiple receivers and/or multiple transceivers.

The wireless communication device 904 may include a digital signal processor (DSP) 921. The wireless communication device 904 may also include a communications interface 923. The communications interface 923 may allow a user to interact with the wireless communication device 904.

The various components of the wireless communication device 904 may be coupled together by one or more buses, which may include a power bus, a control signal bus, a status signal bus, a data bus, etc. For the sake of clarity, the various buses are illustrated in FIG. 9 as a bus system 919.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" or "computer-program product" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 8, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A wireless communication device configured for providing carrier aggregation, comprising:

at least one antenna configured to receive a plurality of wireless signals;
a first transceiver comprising a first downconverting circuitry;
a second transceiver comprising a second downconverting circuitry; and
an inter-transceiver connection that routes a first signal from a low noise amplifier on the first transceiver to the second downconverting circuitry of the second transceiver, wherein the inter-transceiver connection comprises a first line that is coupled between an output of the low noise amplifier on the first transceiver and an input of the second downconverting circuitry of the second transceiver, wherein the inter-transceiver connection allows an architecture configured to process aggregate carrier frequencies on different bands to process signals from non-adjacent carrier frequencies on a single band, and wherein the inter-transceiver connection enables two radio frequency paths to simultaneously receive signals on non-adjacent carrier frequencies.

2. The wireless communication device of claim 1, wherein the inter-transceiver connection also routes a second signal from a low noise amplifier on the second transceiver to the first downconverting circuitry of the first transceiver.

3. The wireless communication device of claim 1, wherein the inter-transceiver connection further comprises a switched connection coupled between outputs of low noise amplifiers on the first transceiver and the second transceiver and inputs of the first downconverting circuitry and the second downconverting circuitry.

4. The wireless communication device of claim 1, wherein the inter-transceiver connection further comprises a second line, wherein the second line is coupled between an output of a low noise amplifier on the second transceiver and an input of the first downconverting circuitry.

5. The wireless communication device of claim 1, wherein the inter-transceiver connection further comprises additional low noise amplifiers, interconnects, and switches that allow the inter-transceiver connection to route a plurality of low noise amplifiers to a plurality of downconverting circuitry.

6. The wireless communication device of claim 1, wherein the wireless communication device does not require four antennas, a power splitter or an external low noise amplifier.

7. A method for receiving a plurality of wireless signals, comprising:
wirelessly receiving a plurality of signals;
amplifying the plurality of signals;
providing a first signal of the plurality of signals to a first downconverting circuitry on a first transceiver;
providing a second signal of the plurality of signals to a second downconverting circuitry on a second transceiver;
processing the first signal using the first downconverting circuitry; and
processing the second signal using the second downconverting circuitry, wherein the method is performed by a wireless communication device comprising an inter-transceiver connection that routes a first signal from a low noise amplifier on the first transceiver to the second downconverting circuitry of the second transceiver, wherein the inter-transceiver connection comprises a first line that is coupled between an output of the low noise amplifier on the first transceiver and an input of the second downconverting circuitry of the second transceiver, wherein the inter-transceiver connection allows an architecture configured to process aggregate carrier frequencies on different bands to process signals from non-adjacent carrier frequencies on a single band, and wherein the inter-transceiver connection enables two radio frequency paths to simultaneously receive signals on non-adjacent carrier frequencies.

8. The method of claim 7, wherein the wireless communication device comprises at least one antenna configured to receive the plurality of wireless signals.

9. The method of claim 7, wherein the inter-transceiver connection also routes a second signal from a low noise amplifier on the second transceiver to the first downconverting circuitry of the first transceiver.

10. The method of claim 7, wherein the inter-transceiver connection further comprises a switched connection coupled between outputs of low noise amplifiers on the first transceiver and the second transceiver and inputs of the first downconverting circuitry and the second downconverting circuitry.

11. The method of claim 7, wherein the inter-transceiver connection further comprises a second line, wherein the second line is coupled between an output of a low noise amplifier on the second transceiver and an input of the first downconverting circuitry.

12. The method of claim 7, wherein the inter-transceiver connection further comprises additional low noise amplifiers, interconnects and switches that allow the inter-transceiver connection to route a plurality of low noise amplifiers to a plurality of downconverting circuitry.

13. The method of claim 7, wherein the wireless communication device does not require four antennas, a power splitter or an external low noise amplifier.

14. An apparatus for receiving a plurality of wireless signals, comprising:
means for wirelessly receiving a plurality of signals;
means for amplifying the plurality of signals;
means for providing a first signal of the plurality of signals to a first downconverting circuitry on a first transceiver;
means for providing a second signal of the plurality of signals to a second downconverting circuitry on a second transceiver;
means for processing the first signal using the first downconverting circuitry; and
means for processing the second signal using the second downconverting circuitry, wherein an inter-transceiver connection routes a first signal from a low noise amplifier on the first transceiver to the second downconverting circuitry of the second transceiver, wherein the inter-transceiver connection comprises a first line that is coupled between an output of the low noise amplifier on the first transceiver and an input of the second downconverting circuitry of the second transceiver, wherein the inter-transceiver connection allows an architecture configured to process aggregate carrier frequencies on different bands to process signals from non-adjacent carrier frequencies on a single band, and wherein the inter-transceiver connection enables two radio frequency paths to simultaneously receive signals on non-adjacent carrier frequencies.

15. The apparatus of claim 14, wherein the apparatus comprises at least one antenna configured to receive the plurality of wireless signals.

* * * * *